United States Patent [19]

Kimura

[11] Patent Number: 5,467,280
[45] Date of Patent: Nov. 14, 1995

[54] VEHICULAR SUSPENSION SYSTEM UTILIZING VARIABLE DAMPING FORCE SHOCK ABSORBER

[75] Inventor: Makoto Kimura, Atsugi, Japan

[73] Assignee: Unisia Jecs Corporation, Kanagawa, Japan

[21] Appl. No.: 99,651

[22] Filed: Jul. 30, 1993

[30] Foreign Application Priority Data

Aug. 4, 1992 [JP] Japan ................................ 4-207716

[51] Int. Cl.⁶ ............................................. B60G 17/015
[52] U.S. Cl. ...................... 364/424.05; 280/707; 280/840
[58] Field of Search ...................... 364/424.05, 424.01, 364/426.01, 508; 280/707, 714, 840, 709, 712; 267/64.11

[56] References Cited

U.S. PATENT DOCUMENTS

| | | | |
|---|---|---|---|
| 4,742,998 | 5/1988 | Schubert | 267/136 |
| 5,033,770 | 7/1991 | Kanimura et al. | 364/424.05 |
| 5,088,761 | 2/1992 | Takehara et al. | 280/707 |
| 5,200,895 | 4/1993 | Emura et al. | 364/424.05 |
| 5,276,621 | 1/1994 | Henry et al. | 364/424.05 |
| 5,276,623 | 1/1994 | Wolfe | 364/424.05 |
| 5,289,380 | 2/1994 | Kimura | 364/424.05 |
| 5,377,107 | 12/1994 | Shimizu et al. | 364/424.05 |
| 5,401,052 | 3/1995 | Yoshioka et al. | 280/707 |

FOREIGN PATENT DOCUMENTS

| | | |
|---|---|---|
| 4137712A1 | 5/1992 | Germany. |
| 61-163011 | 7/1986 | Japan. |

OTHER PUBLICATIONS

German Official Action and translation.

*Primary Examiner*—Kevin J. Teska
*Assistant Examiner*—Tyrone V. Walker
*Attorney, Agent, or Firm*—Ronald P. Kananen

[57] ABSTRACT

A vehicular suspension system comprises a variable damping force shock absorber utilizing a variable semiactive hydraulic damper having a plurality of different damping characteristics, a sensor for detecting an absolute vertical velocity of a sprung mass of the vehicle, and a control unit responsive to the vertical velocity for generating a control signal based on the vertical velocity to adjust the damping characteristic of the damper. The control unit includes a dead-band controlling circuit for adjusting the damping characteristic to a minimum damping characteristic only when the control signal value is maintained within a dead band for the vertical velocity. The dead-band controlling circuit varies upper and lower thresholds of the dead band depending on the magnitude of the vertical velocity.

16 Claims, 14 Drawing Sheets

VEHICULAR SUSPENSION SYSTEM UTILIZING VARIABLE DAMPING FORCE SHOCK ABSORBER

BACKGROUND OF THE INVENTION

1. Field of the Invention

The present invention relates to a vehicular suspension system employing a plurality of variable damping force shock absorbers, each including a variable semi-active hydraulic damper which is optimally applied for suppressing bouncing, rolling, and pitching motions of the vehicle, and specifically to a system which is capable of actively and smoothly controlling damping coefficients of plural semi-active hydraulic dampers depending upon a vertical velocity of a sprung mass, such as the vehicle body.

2. Description of the Prior Art

Recently, there have been proposed and developed various vehicular suspension systems with variable semiactive hydraulic dampers, for actively suppressing vehicle attitude change under various vehicle running conditions and road surface conditions. One such suspension system employing variable semiactive dampers has been disclosed in Japanese Patent First Publication No. 61-163011. In this conventional system, a variable semiactive damper may be generally operated in a manner similar to the hypothetical "sky-hook" damper discussed in U.S. Pat. No. 4,742,998. A well-known control policy for such a "sky-hook" damper dictates that the damper is adjusted to a harder damping characteristic when the sign of the product of the sprung-mass absolute vertical velocity times the relative velocity between the sprung mass and the unsprung mass such as the road wheel is positive or plus, i.e., is greater than zero. Conversely, when the sign of the aforesaid product is negative or minus, i.e., is less than zero, the control policy dictates that the damper is adjusted to a softer damping characteristic. The previously noted damping characteristic control is independently performed at four variable semiactive dampers, each associated with one of the road wheels. When a semiactive damper is in its ON state, the damping coefficient thereof can be modified between a large (theoretically infinite) number of different magnitudes. In general, the damper includes a valve element having a plurality of positions to provide continuously variable damping coefficients of the damper and an actuator drivingly coupled with the valve element. Assuming that the damper is maintained at the softest damping force characteristic when the absolute vertical velocity of the sprung mass is zero, the damping control operation for the damper may be performed repetitively in the event that the absolute vertical velocity fluctuates within a slight velocity range, i.e., in the vicinity of the vertical velocity of approximately "0", due to high-frequency vibrations transmitted through the road wheel to the vehicle body during a high-speed straight-ahead driving of the vehicle on dry pavements. As set forth above, the prior art suspension system with the variable semiactive damper suffers from the drawback that the actuator is frequently energized in response to high-frequency vibrations transmitted from the road surface during the high-speed driving on dry pavements, and as a result the durability of the hydraulic damper is deteriorated and that the power consumption of the system is increased. In order to solve the above noted problem, it is advantageous to provide a predetermined dead band for the detected absolute vertical velocity of the sprung mass, so as to prevent frequent energizations of the actuator employed in the damper due to the slight velocity fluctuations. With the predetermined dead band with respect to the absolute vertical velocity of the sprung mass, since the actuator is de-energized when the value of the absolute vertical velocity is within the predetermined dead band, the frequency of energization of the actuator can be reduced. However, upon the value of the absolute vertical velocity is varied out of the dead band, the hydraulic damper may be rapidly switched to a different damping force characteristic, with the result that the damper may experience shock forces of significant magnitude. As appreciated from the above, the vehicle occupants may feel uncomfortable upon transition out of the dead band.

SUMMARY OF THE INVENTION

It is, therefore in view of the above disadvantages an object of the present invention to provide an improved vehicular suspension system with at least one variable semiactive damper, which can assure a high durability of the system and reduce power consumption of the system, by preventing undesirable energization tending to occur in an actuator employed in the damper due to slight positive and negative velocity fluctuations created by high-frequency vibrations input from the road wheel, for example during a high-speed straight-ahead driving on dry pavements.

It is another object of the invention to assure a smooth modification from one damping characteristic of a variable semiactive damper employed in a vehicular suspension system to the other damping characteristic, during transition out of a predetermined dead band with respect to an absolute vertical velocity of the sprung mass.

It is a further object of the invention to enhance a responsiveness of a vehicular suspension system with respect to an absolute vertical velocity of the sprung mass serving as a control parameter.

In order to accomplish the aforementioned and other objects of the invention, a vehicular suspension system comprises a variable damping force shock absorber disposed between a vehicle body and either one of road wheels and including a variable semiactive hydraulic damper which is operable between a plurality of different damping characteristics, a sensor for detecting an absolute vertical velocity of a sprung mass of the vehicle to generate an absolute vertical velocity indicative signal, a control unit responsive to said vertical velocity, for generating a control signal based on said vertical velocity to adjust the damping characteristic of said damper, and said control unit including a dead-band controlling means for adjusting the damping characteristic to a minimum damping characteristic only when the control signal value is maintained within a controlled threshold value of a dead band for said vertical velocity, characterized in that said dead-band controlling means initially sets the threshold value of the dead band in such a manner as to multiplying a ratio of a damping force generated at a minimum damping characteristic to a damping force generated at a maximum damping characteristic at a predetermined piston speed of said damper by a preselected threshold of the control signal value in relation to said maximum damping characteristic, and that said dead-band controlling means renews said preselected threshold with a current value of said control signal until the control signal value reaches a peak value from the time when the control signal value exceeds the preselected threshold, and increasingly varies said initially set threshold value of the dead band in proportion to an increase in said preselected threshold. The threshold value of the dead band is maintained at said initially set threshold value when the absolute value of the control signal value is greater than 0 and less than said preselected threshold during ascending to the peak value, and is increased in proportion to an increase in the control signal value when the absolute value of the control signal value is greater than said preselected threshold and less than the peak value during ascending to the peak value, and is maintained at a higher threshold level than said initially set threshold value during descending from the peak value to 0. It is preferable that the ratio of the damping force generated at the minimum damping characteristic to the damping force generated at the maximum damping characteristic is varied depending on a vehicle speed, such that the ratio is reduced in accordance with an increase in the vehicle speed. An initial threshold value of the dead band of said vertical velocity for the extension phase of said shock absorber and an initial threshold value of the dead band of said vertical velocity for the compression phase of said shock absorber may be set independently to different values. Alternatively, an initial threshold value of the dead band of said vertical velocity for the front-wheel side and an initial threshold value of the dead band of said vertical velocity for the rear-wheel side may be set independently to different values. The damper is operable between an extension-phase hard region in which the damping characteristic for the extension phase is variably adjusted and the damping characteristic for the compression phase is stationarily maintained at the lowest damping characteristic, a compression-phase hard region in which the damping characteristic for the compression phase is variably adjusted and the damping characteristic for the extension phase is stationarily maintained at the lowest damping characteristic, and a soft region in which the damping characteristics for the extension phase and the compression phase are both maintained at the lowest damping characteristics. The control unit adjusts the damping characteristic of said damper into said extension-phase hard region when the direction of said vertical velocity is an upward direction and the control signal value exceeds an upper threshold value of the dead band, and into said compression-phase hard region when the direction of said vertical velocity is a downward direction and the control signal value exceeds a lower threshold value of the dead band, and into said soft region when said vertical velocity is within said dead band. The control signal may be equivalent to said vertical velocity indicative signal generated from said sensor. The control signal may be dependent on the product between a bouncing rate, a pitching rate, and a rolling rate, all of which are derived from said vertical velocity indicative signal. The bouncing rate may be derived on the basis of a mean value of four vertical velocities detected at four points of the vehicle body respectively located adjacent to four road wheels. To provide a more precise damping characteristic controls for four shock absorbers each associated with either one of four road wheels, it is desirable that four bouncing rates are derived independently of each other on the basis of the respective vertical velocities detected at four points of the vehicle body respectively located adjacent to four road wheels.

The vehicular suspension system may further comprise a load sensor arranged in said shock absorber for detecting a damping force of said shock absorber. In this case, the control unit performs a damping force control for said damper on the basis of a comparison between the current signal value of said detected vertical velocity and the threshold value of the dead band controlled by said dead-band controlling means when the product of the control signal value times the damping force detected by said load sensor is positive, and said control unit adjusts the damping characteristic of said damper into said soft region when the product is negative. The hydraulic damper may comprise a stepwisely variable semiactive damper in which the damping characteristic thereof can be switched stepwise by an electronically operated pulse motor, such as a step motor. It is preferable that the hydraulic damper may comprise a continuously variable semiactive damper in which the damping characteristic thereof is continuously switchable by an electronically operated actuator.

DESCRIPTION OF THE PREFERRED EMBODIMENTS

First embodiment

Figure 1:
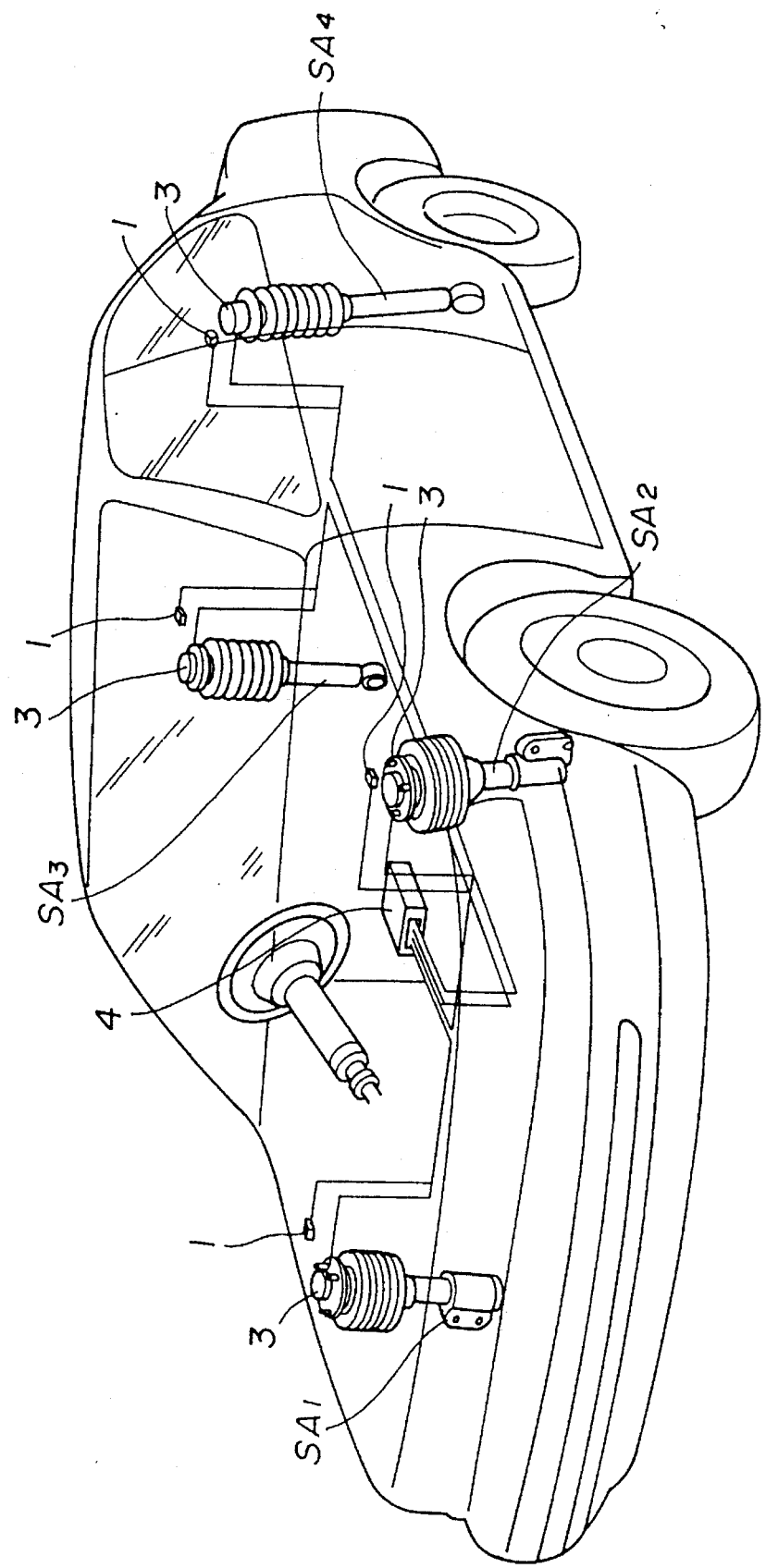
FIG. 1 is a schematic perspective view illustrating an automotive vehicle incorporating a suspension system with a variable semiactive hydraulic damper according to the invention.

Referring now to the drawings, particularly to FIG. 1 there is shown a perspective view of the automotive vehicle employing four variable damping force shock absorbers SA1, SA2, SA3 and SA4, each placed at either one of the vehicle wheels and having a variable semiactive hydraulic damper. The shock absorber as generally referred to will be hereinafter denoted as "SA". Attached to the vehicle body in the vicinity of the respective shock absorber SA is a vertical acceleration sensor 1 to monitor a vertical acceleration exerted on the vehicle body. The vertical acceleration sensor 1 will be hereinafter abbreviated as a "G sensor". As seen in FIG. 1, a pulse motor such as a magnetic stepping motor 3 is attached onto each shock absorber SA so as to provide various different damping coefficients of the damper as hereinbelow described in detail. Disposed adjacent to a driver seat is a control unit 4, so as to output a control signal to each of the pulse motors 3 on the basis of the signals input from the G sensors 1. The pulse motor 3 rotates stepwise towards a target angular position or step angle in response to the control signal.

Figure 2:
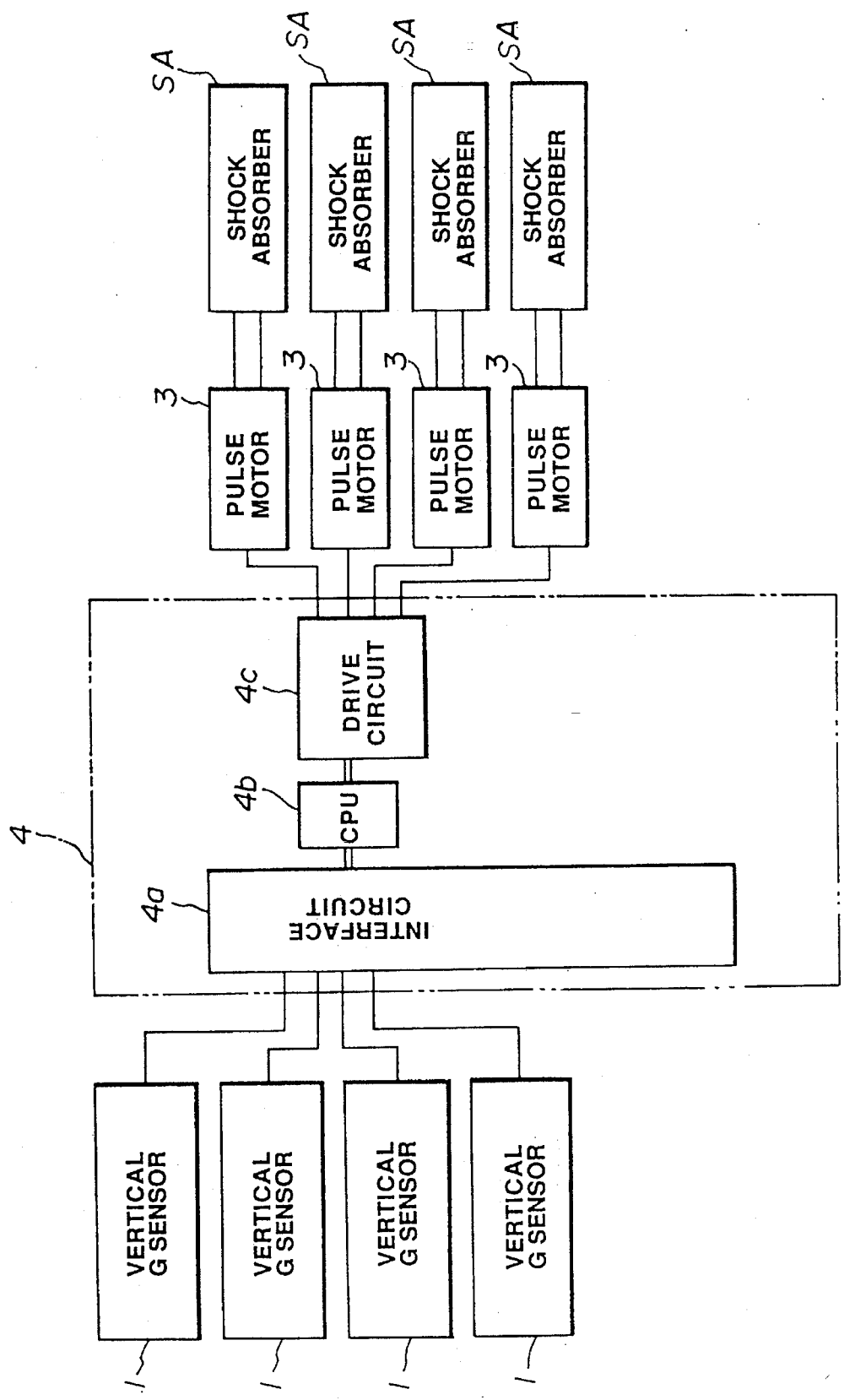
FIG. 2 is a block diagram illustrating a first embodiment of the suspension system of the invention.

Referring to FIG. 2, the control unit 4 comprises an input interface circuit 4a, a central processing unit 4b, and a drive circuit 4c. The input interface 4a receives vertical acceleration indicative signals from the G sensors 1, while the drive circuit 4c is connected to the respective pulse motors 3 to provide a desirable step angle of each motor 3.

Figure 3:
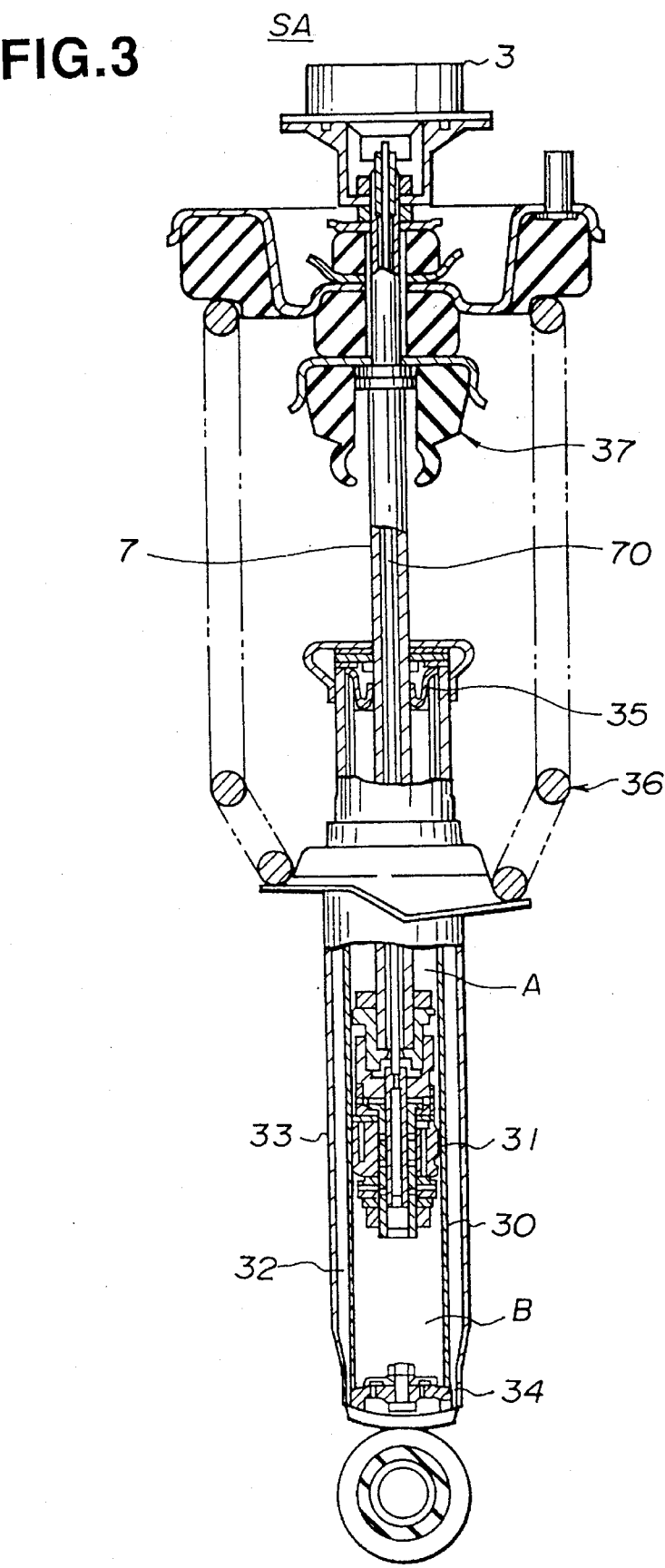
FIG. 3 is an illustration of a variable damping force shock absorber having the hydraulic damper, partially sectioned.

Referring to FIG. 3, the variable damping force shock absorber assembly SA comprises an inner cylinder 30, a piston 31 disposed in the cylinder 30 in a manner so as to divide an internal space defined in the cylinder 30 into upper and lower chambers A and B both filled with working fluid such as hydraulic oil, and an outer cylinder 33 coaxially arranged in such a manner as to surround the inner cylinder 30 in a fluid-tight fashion. Reference numeral 32 represents a reservoir chamber. The shock absorber assembly also includes a base 34 hermetically covering the lower opening end of the inner cylinder 30 to define partly the lower chamber B, a guide member 35 attached to the upper end of the inner cylinder 30 to slidably guide or receive the piston rod 7 which is firmly secured onto the vehicle body at its upper end, a suspension spring 36 operably disposed between the outer cylinder 33 and the vehicle body, and a substantially annular bumper rubber 37 coaxially arranged on and firmly attached to the piston rod 7 to restrict a maximum compressing movement of the piston 31 relative to the cylinder 30 by abutment between the bumper rubber 37 and the upper end of the cylinder 30.

Figure 4:
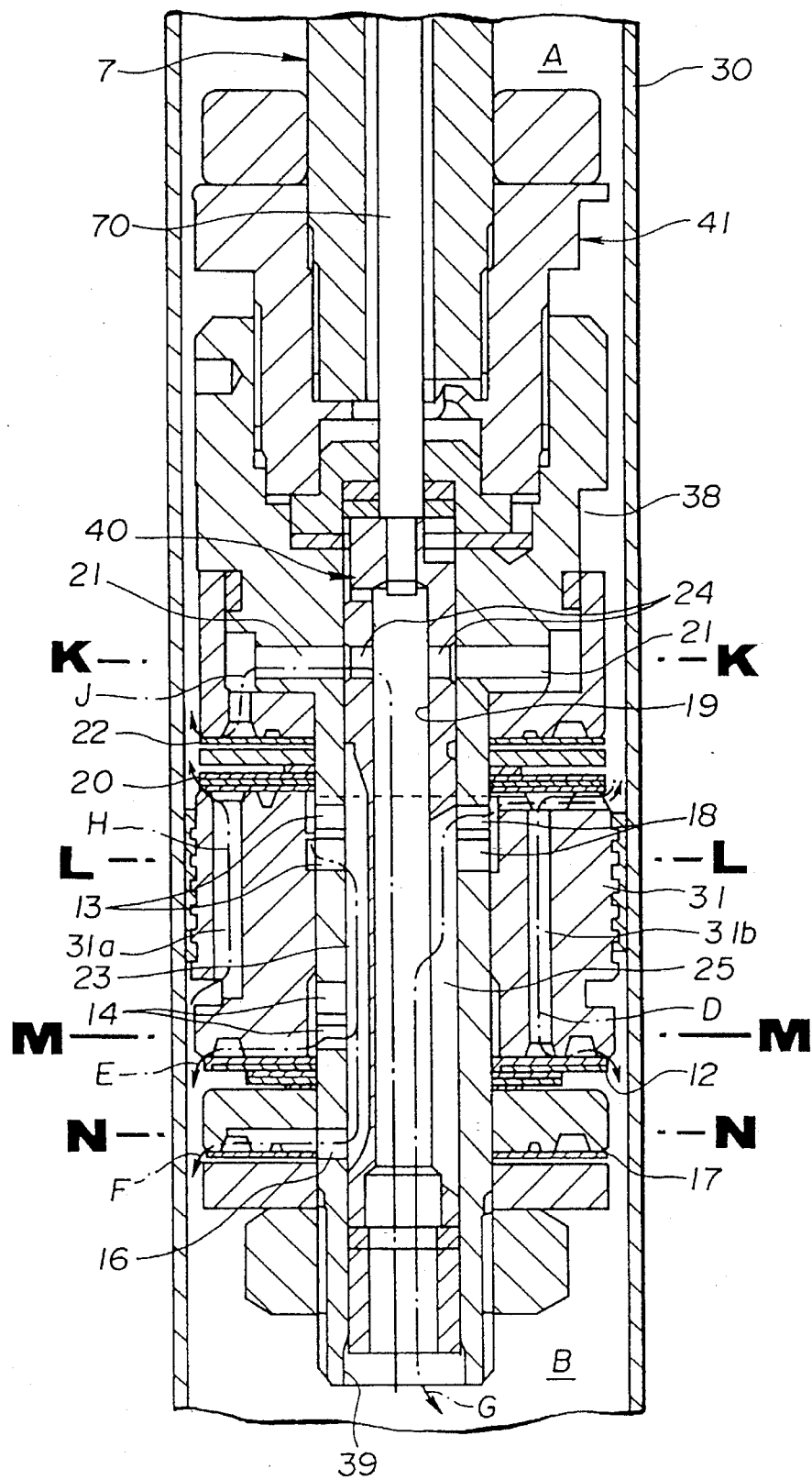
FIG. 4 is a partially enlarged cross-sectional view illustrating the hydraulic damper employed in the shock absorber shown in FIG. 3.

Referring to FIG. 4, the hydraulic damper of the shock absorber SA comprises the piston 31 defining a compression-phase cylindrical bore 31a and an extension-phase cylindrical bore 31b, a compression-phase damping valve 20 which is arranged for restricting a fluid flow from the lower chamber B via the upper opening end of the bore 31a to the upper chamber A, and an extension-phase damping valve 12 which is arranged for restricting a fluid flow from the upper chamber A via the lower opening end of the bore 31b to the lower chamber B. As seen in FIG. 4, each of the two damping valves 20 and 12 is comprised of a plurality of stacked disc springs to assure a suitable flexibility. Reference numeral 41 designates a rebound stopper firmly secured onto the lower end of the piston rod 7, for restricting a maximum extending movement of the piston 31 relative to the cylinder 30 by abutment between the rebound stopper 41 and the guide member 35. The damper also includes an axially extending stud 38 which is firmly secured to the lower male screw-threaded end of the stopper 41 and coaxially arranged to the piston rod 7. The stud 38 has a female screw-threaded section coupled with the rebound stopper 41 and a relatively small-diameter axially extending cylindrical hollow section onto which the piston 31 is coaxially fitted by tightening a nut (not numbered). Defined in the cylindrical hollow section of the stud 38 is an axially extending central bore 39 serving as a communication passage interconnecting the upper and lower chambers A and B. The damper includes a substantially cylindrical valve element 40 coaxially aligned with and rotatably fitted into the cylindrical hollow section of the stud 38. Reference numeral 70 designates an axially elongated control rod being connected to the drive shaft of the pulse motor 3 at the upper end thereof and firmly press-fitted into the upper end of the valve element 40 at the lower end thereof. As seen in FIGS. 4, 7A, 7B, 7C, the stud 38 has radially extending five ports, namely first ports 21, second ports 13, third ports 18, fourth ports 14, and fifth ports 16, while the valve element 40 has an axially extending central bore 19, first side bores 24, second side bores 25, and elongated side grooves 23. The damper also includes a pair of check valves, namely an extension-phase check valve 17 which is fluidly disposed to allow a restricted fluid flow from the chamber A to the chamber B via a predetermined fluid passage way F and to block back flow in its opposing direction during extension stroke (rebounding stroke), and a compression-phase check valve 22 which is fluidly disposed to allow a restricted fluid flow from the chamber B to the chamber A via a predetermined fluid passage way J and to block back flow in its opposing direction during compression stroke (bounding stroke). Each of the check valves 17 and 22 is annular in shape and comprised of a disc spring. The above-mentioned two passage ways F and J will be hereinbelow discussed in detail.

With the above arrangements, for the compression phase, defined are three passage ways, namely a first compression-phase passage way H which permits a flow of damping fluid from the lower chamber B through the cylindrical bore 31a and the compression-phase damping valve 20 to the upper chamber A, a second compression-phase passage way J which permits a flow of damping fluid from the chamber B through the central bore 19 of the valve element 40, the first side bores 24, the first ports 21 and the compression-phase check valve 22 to the chamber A, and a bypass passage way G which permits a flow of damping fluid from one of the upper and lower chambers A and B to the other via the central bore 19 of the valve element 40, the second side bores 25 and the third ports 18.

For the extension phase, defined are four passage ways, namely a first extension-phase passage way D which permits a flow of damping fluid from the upper chamber A through the cylindrical bore 31b and the extension-phase damping valve 12 to the lower chamber B, a second extension-phase passage way E which permits a flow of damping fluid from the upper chamber A through the second ports 13, the side grooves 23, the fourth ports 14 and the extension-phase damping valve 12 to the lower chamber B, a third extension-phase passage way F which permits a flow of damping fluid from the upper chamber A through the second ports 13, the side grooves 23, the fifth ports 16 and the extension-phase check valve 17 to the lower chamber B, and the previously described bypass passage way G.

The step angle of the pulse motor 3 can be adjusted stepwise depending on the control signal value from the control unit 4, whereby a relative angular position of the valve body 40 to the stud 38 is switchable between a large (theoretical infinite) number of positions. As appreciated from the above, each of ports 21, 13, 18, 14 and 16 serves as a variable throttle or orifice whose throttling ratio is varied depending on the angular position of the valve element 40. As hereinafter discussed in detail, the valve body 40 is operable among the first, second and third angular positions shown in FIGS. 7A, 7B, 7C, and FIGS. 8A, 8B, 8C, and FIGS. 9A, 9B, 9C, respectively.

Figure 6:
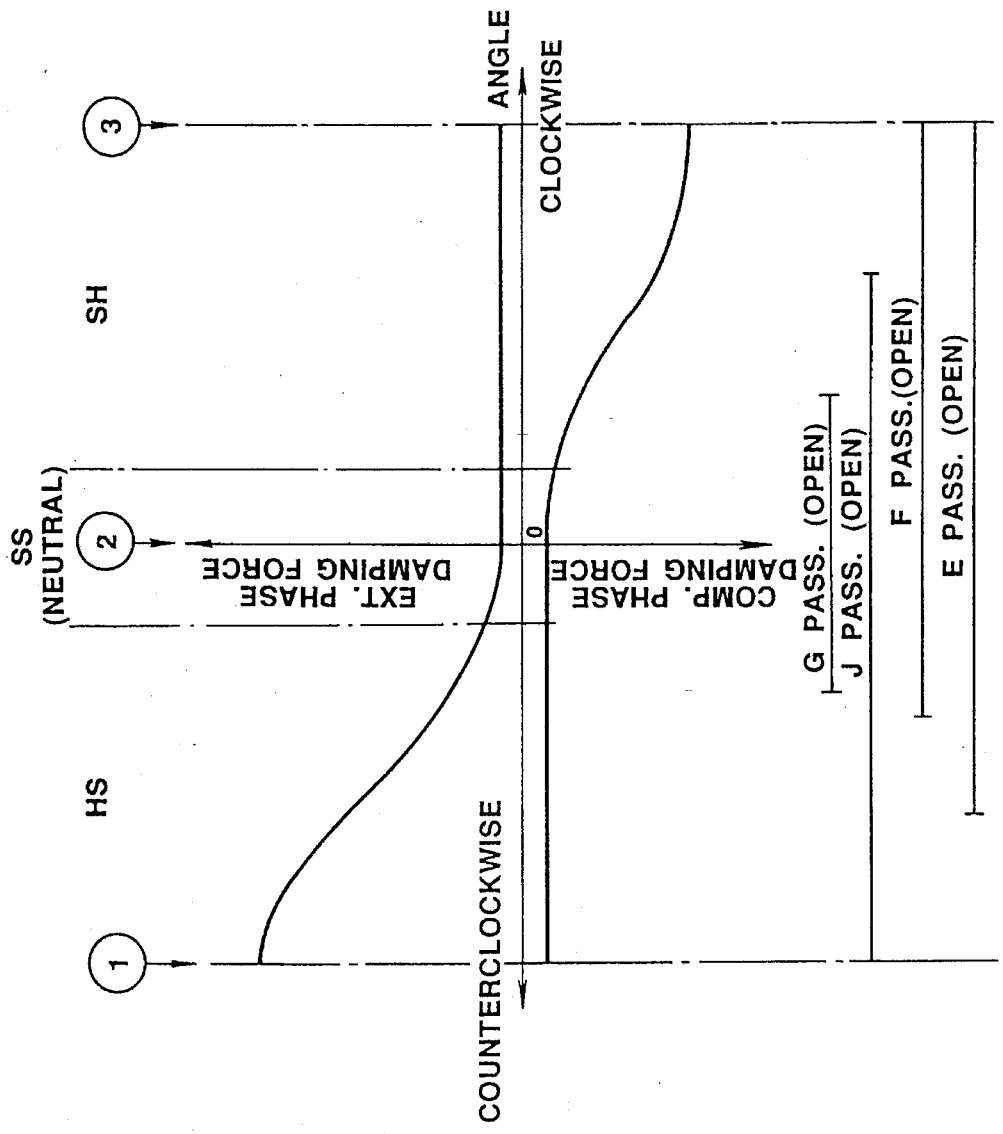
FIG. 6 is a graph illustrating damping force characteristics at various step angles or angular positions of a magnetic pulse motor associated with the shock absorber.
Figure 7A:
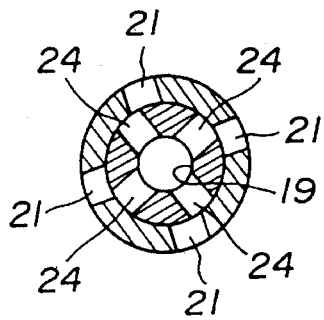
FIGS. 7A, 7B and 7C are lateral cross-sectional views respectively taken along lines K—K, L—L or M—M, and N—N of FIG. 4 at the first angular position illustrated in FIG. 6.
Figure 7B:
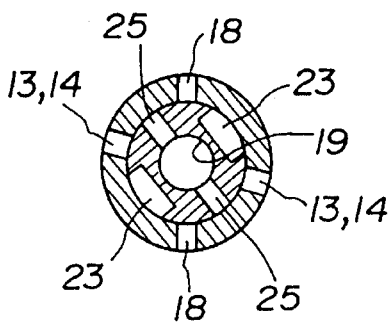
Figure 7C:
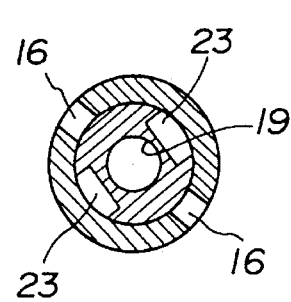
Figure 10:
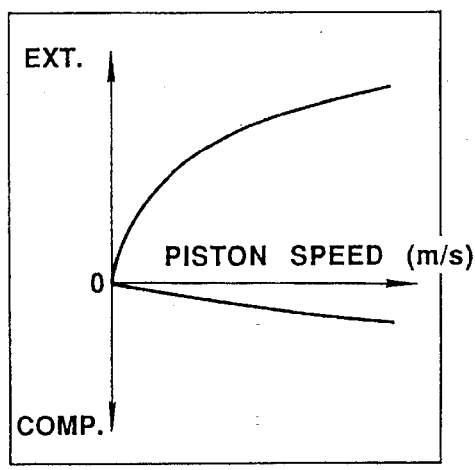
FIGS. 10A, 10B and 10C are graphs illustrating damping force versus piston speed characteristics of the shock absorber respectively at the first, second, and third angular positions shown in FIG. 6.
Figure 10:
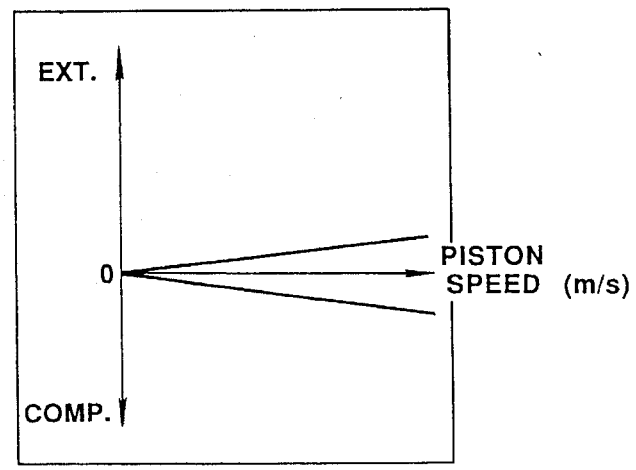
Figure 10:
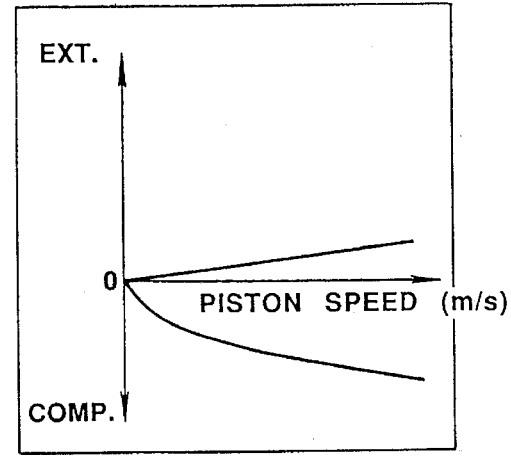

In FIGS. 7A, 7B, 7C, the valve body 40 is maintained in the first angular position in which the valve body 40 is rotated counterclockwise from a neutral position of the pulse motor 3. In the first angular position, only the first ports 21 are kept open as shown in FIG. 7A, while the remaining four ports 13, 18, 14 and 16 are kept closed as shown in FIGS. 7B and 7C, with the result that the second compression-phase passage way J is left open and the remaining passage ways E, F and G are kept closed. The first angular position of the valve element 40 corresponds to the leftmost position illustrated in FIG. 6. Under this condition, the semiactive damper of the shock absorber SA exhibits an extremely hard damping characteristic for the extension phase because of an excessively restricted fluid flow only through the first extension-phase passage way D kept open and a soft damping characteristic for the compression phase because of a relatively smooth fluid flow through the first and second compression-phase passage ways H and J both kept open. In the first angular position of the valve element 40, the damper exhibits the damping force versus piston speed characteristic shown in FIG. 10A.

Figure 8A:
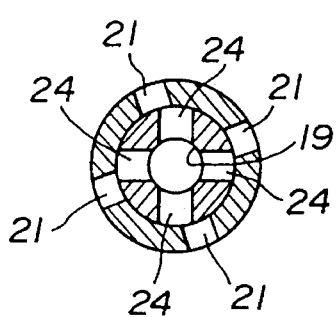
FIGS. 8A, 8B and 8C are lateral cross-sectional views respectively taken along lines K—K, L—L or M—M, and N—N of FIG. 4 at the second angular position illustrated in FIG. 6.
Figure 8B:
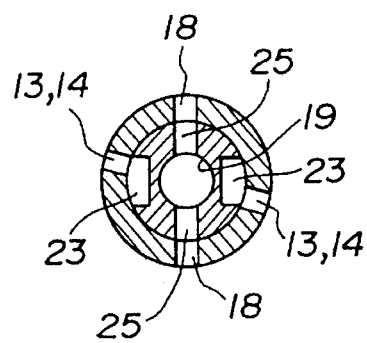
Figure 8C:
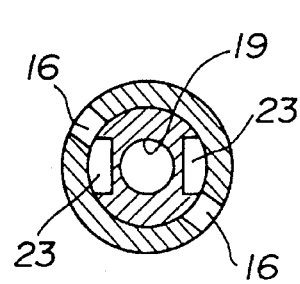

In FIGS. 8A, 8B and 8C, the valve element 40 is maintained in the second angular position essentially corresponding to the neutral position of the motor 3 in which the five ports 21, 13, 18, 14 and 16 are all kept open, with the result that the second and third extension-phase passage ways E and F, and the second compression passage way J and the bypass passage way G are all left open. The second angular position of the valve element 40 corresponds to the central position illustrated in FIG. 6. Under this condition, the damper exhibits soft damping characteristics both for the extension phase and for the compression phase, owing to a full fluid communication established by all of the extension-phase and compression-phase passage ways D, E, F and H, J and the bypass passage way G. In the second angular position, the damper exhibits the damping force versus piston speed characteristic shown in FIG. 10B.

Figure 9A:
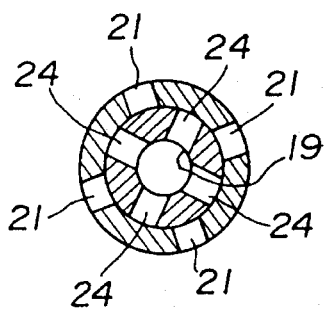
FIGS. 9A, 9B and 9C are lateral cross-sectional views respectively taken along lines K—K, L—L or M—M, and N—N of FIG. 4 at the third angular position illustrated in FIG. 6
Figure 9B:
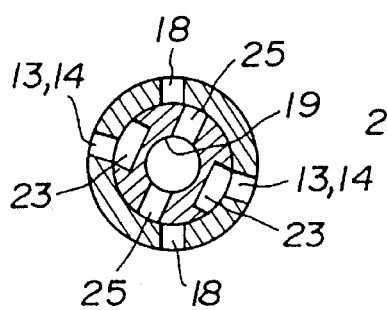
Figure 9C:
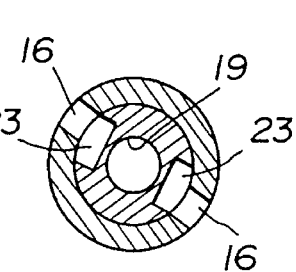

In FIGS. 9A, 9B and 9C, the valve element 40 is maintained in the third angular position in which the valve body 40 is rotated clockwise from the neutral position. In the third angular position, the second, fourth and fifth ports 13, 14 and 16 are kept open as shown in FIGS. 9B and 9C, while the first and third ports 21 and 18 are kept closed as shown in FIGS. 9A and 9B. As a result, the second and third extension-phase passage ways E and F are left open and the remaining passage ways G and J are kept closed. The third angular position corresponds to the rightmost position illustrated in FIG. 6. Under this condition, the damper exhibits a soft damping characteristic for the extension phase because of a relatively smooth fluid flow through the first, and second and third extension-phase passage ways D, E and F and a relatively hard damping characteristic for the compression phase because of a restricted fluid flow only through the first compression-phase passage way H. In the third angular position, the damper exhibits the damping force versus piston speed characteristic shown in FIG. 10C.

As appreciated from the above, assuming that the valve element 40 is rotated counterclockwise from the neutral position shown in FIGS. 8A, 8B and 8C to the first angular position shown in FIGS. 7A, 7B and 7C, a fluid passage area of the opening of each of the second, third, fourth and fifth ports 13, 18, 14 and 16 is gradually choked owing to the counterclockwise motion from the neutral position towards the first angular position, and as a result the respective fluid passage areas of the second and third extension-phase passage ways E and F and the bypass passage way G are decreased gradually. Thus, the damping force for the extension phase is gradually increased as shown in the left half of FIG. 6. In this case, since a fluid passage area of the respective first port 21 is not decreased irrespective of the counterclockwise motion of the valve element 40, the second compression-phase passage way J insures a relatively smooth fluid flow during compression stroke or bounding stroke, and as a result a soft damping force characteristic for the compression phase is held stationary during shifting from the neutral position to the first angular position.

On the other hand, assuming that the valve element 40 is rotated clockwise from the neutral position shown in FIGS. 8A, 8B and 8C to the third angular position shown in FIGS. 9A, 9B and 9C, a fluid passage area of the opening of each of the first and third ports 21 and 18 is gradually choked owing to the clockwise motion from the neutral position towards the third angular position, and as a result the respective fluid passage areas of the bypass passage way G and the second compression-phase passage way J are decreased gradually. Thus, the damping force for the compression phase is gradually increased as shown in the right half of FIG. 6. In this case, since both fluid passage areas of the second and fourth ports 13 and 14 are kept stationary irrespective of the clockwise motion of the valve element 40 and a fluid passage area of the respective fifth port is increased due to the above clockwise motion, the first extension-phase passage way D is cooperative with the second and third extension-phase passage ways E and F to assure a relatively smooth fluid flow during extension stroke or rebounding stroke, and as a result a soft damping force characteristic for the extension phase is held stationary during shifting from the neutral position to the third angular position.

In FIG. 6, a narrow region SS close to the neutral position (second angular position) will be referred to as a "soft damping characteristic region" at which the damping force for the extension phase and the damping force for the compression phase are both kept low. The left-hand side region HS will be referred to as an "extension-phase hard damping characteristic region" at which the damping force for the extension phase is gradually increased in accordance with an increase in the step angle in the counterclockwise direction and the damping force for the compression phase is kept low. The right-hand side region SH will be referred to as a "compression-phase hard damping characteristic region" at which the damping force for the compression phase is gradually increased in accordance with an increase in the step angle in the clockwise direction and the damping force for the extension phase is kept low.

Figure 5:
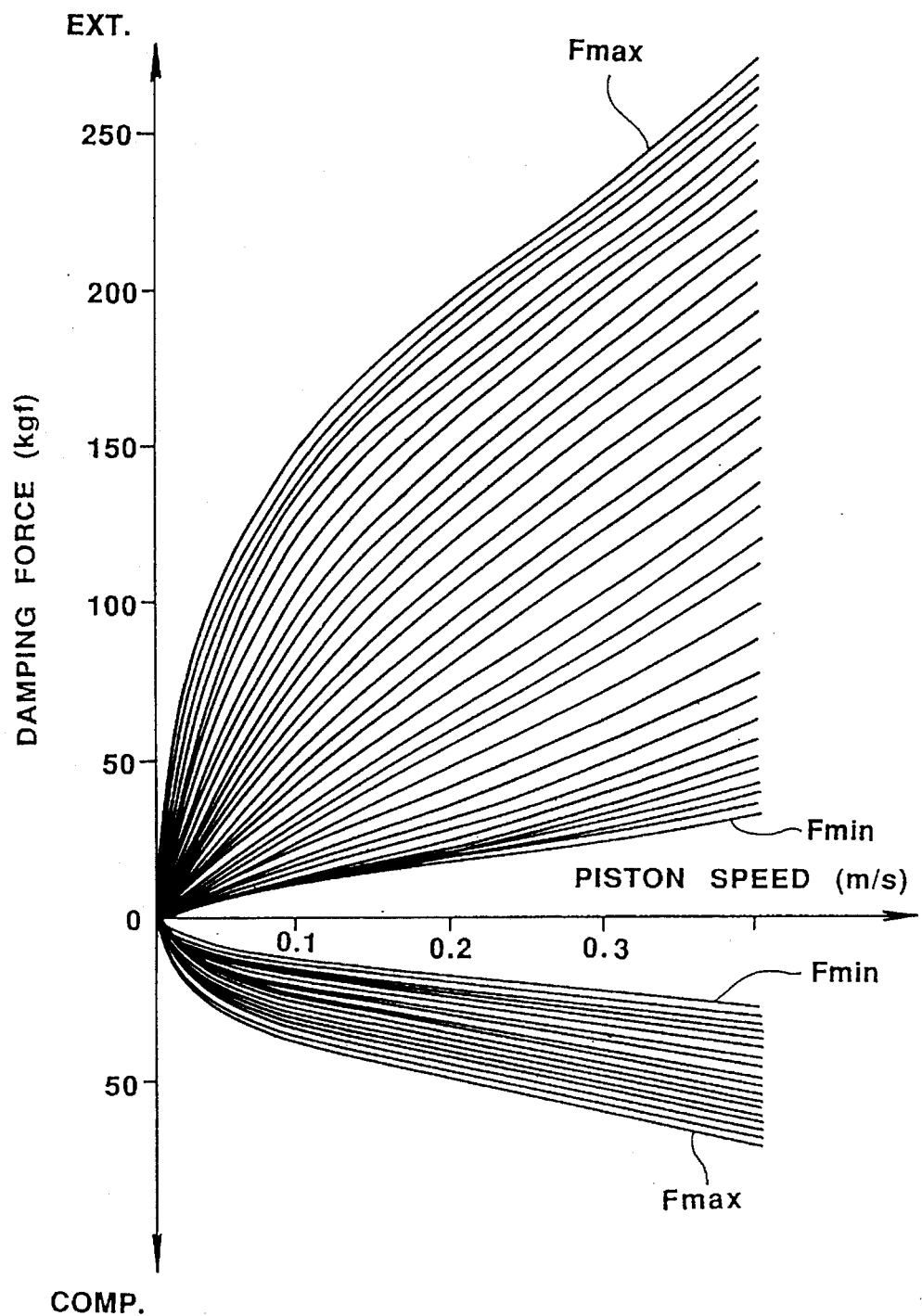
FIG. 5 is a graph illustrating various damping force versus piston speed characteristic curves of the damper shown in FIG. 4.
Figure 11:
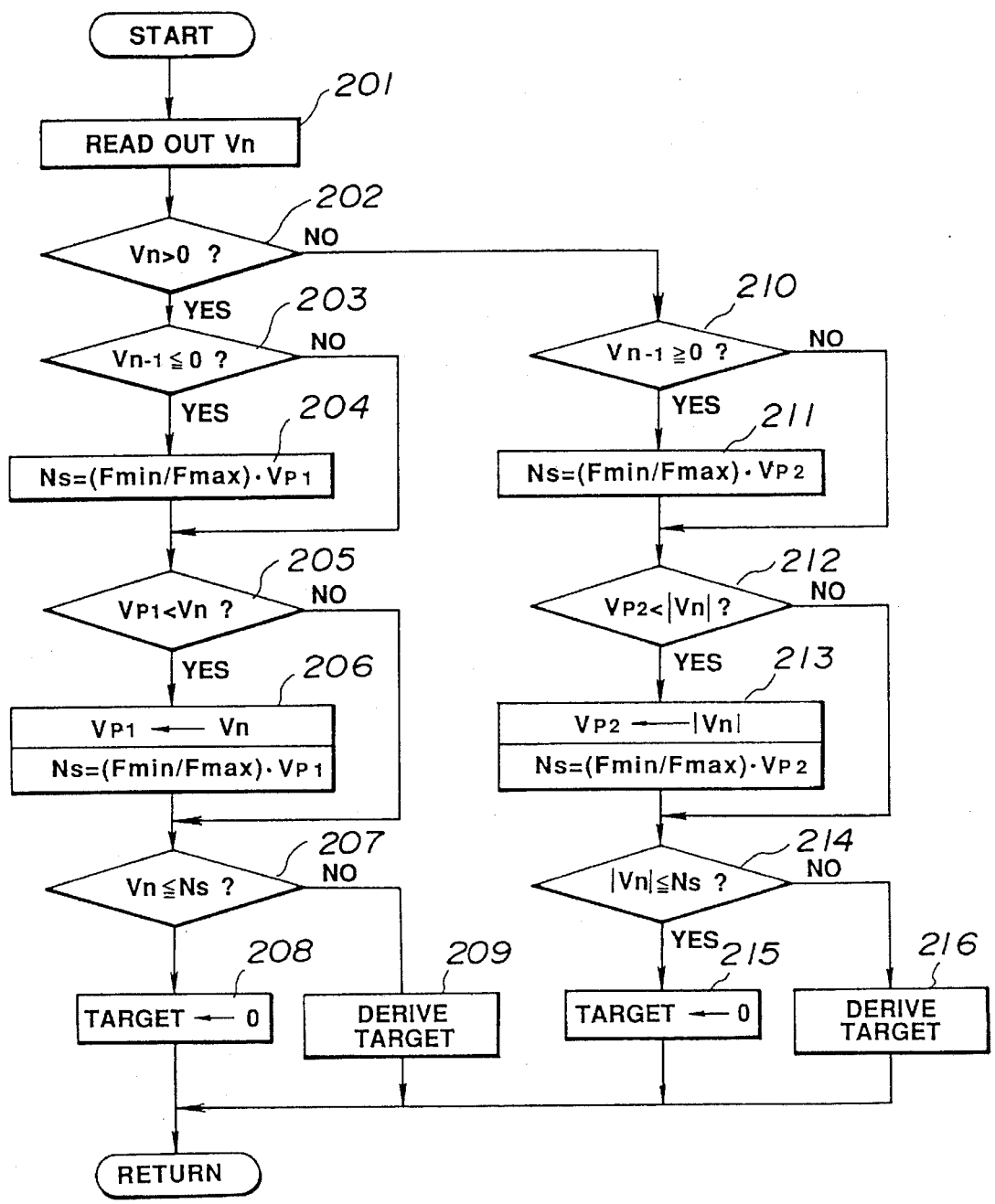
FIG. 11 is a flow chart illustrating a control procedure of a control unit for the hydraulic damper employed in the system of the first embodiment.

As shown in FIG. 5, the shock absorber SA with the semiactive damper thus exhibits stepwise variable damping force versus piston speed characteristics being switchable at multiple stages depending on the angular position of the valve element or the step angle of the pulse motor 3. The pulse motor is controlled by the control unit 4. The operation of the control unit will be hereinafter described in detail in accordance with the flow chart shown in FIG. 11.

In step 201, a signal value Vn indicative of an absolute vertical velocity of the sprung mass such as the vehicle body is derived from the sensor output of the G sensor 1 via integration process, in which the upward vertical velocity is regarded as a positive value and the downward vertical velocity is regarded as a negative value.

In step 202, a test is made to determine whether the vertical velocity indicative signal value Vn exceeds 0. When the answer to step 202 is affirmative (YES), step 203 proceeds in which a test is made to determine whether the preceding vertical velocity indicative signal value Vn−1 prior to the current vertical velocity indicative signal value Vn is equal to or less than 0. When the answer to step 202 is negative (NO), step 210 proceeds in which a test is made to determine whether the preceding vertical velocity indicative signal value Vn−1 is equal to or greater than 0. Two pairs of steps (202, 203) and (202, 210) are provided to determine whether or not the vertical vehicle velocity indicative signal Vn is in a zero-crossing state.

When the answer to step 203 is affirmative, step 204 proceeds. Alternatively, if the answer to step 203 is negative, the procedure jumps to step 205. In step 204, a threshold value Ns of a dead band for the upward vertical velocity indicative signal value Vn is set to an initial threshold value derived on the basis of the following equation.

$$Ns=(Fmin/Fmax)Vp1$$

where Fmin/Fmax represents a ratio of the damping force plotted on the minimum damping force characteristic curve Fmin for the extension phase to the damping force plotted on the maximum damping force characteristic curve Fmax for the extension phase at a predetermined piston speed of the shock absorber SA, and Vp1 represents an upper threshold value preselected at the maximum damping position which corresponds to the first angular position of the valve element 40 at which the damper exhibits the maximum damping force versus piston speed characteristic Fmax for the extension phase. Note that the upper threshold value Vp1 is not equivalent to the threshold value Ns set as an upper limit of the dead band, but corresponds to the preselected upper threshold value for the upward vertical velocity in relation to the maximum damping force characteristic for the extension phase. Thus, the shock absorber SA exhibits the extension-phase maximum damping characteristic in a velocity range above the preselected upper threshold value Vp1.

In step 205, a test is made to determine whether the current vertical speed indicative signal value Vn exceeds the preselected upper threshold value Vp1. When the answer to step 205 is affirmative, step 206 proceeds. If the answer to step 205 is negative, the flow jumps to step 207. In step 206, the preselected upper threshold value Vp1 is renewed and replaced with the current vertical velocity indicative signal value Vn. The threshold value Ns is also renewed owing to the renewed upper threshold value Vp1. The renewals of the threshold values Vp1 and Ns are both performed at the region c (see FIG. 12) until the vertical velocity indicative signal value Vn reaches a peak value P1 (see FIGS. 12 and 13) from the time point at which the vertical velocity indicative signal value Vn exceeds the preselected upper threshold value Vp1. In step 207, a test is made to determine whether the vertical velocity indicative signal value Vn is equal to or less than the current upper threshold value Ns. If the answer to step 207 is affirmative, the flow proceeds to step 208 in which the angular position of the valve element 40 or the pulse motor 3 is shifted towards the neutral position shown in FIGS. 8A, 8B, and 8C and set at the target step angle of 0, with the result that the shock absorber is adjusted within the soft damping characteristic region SS. Alternatively, if the answer to step 207 is negative, the flow proceeds to step 209 in which the target angular position of the pulse motor 3 or the target damping position of the shock absorber SA is derived on the basis of the magnitude of the current vertical velocity indicative signal value Vn so as to ensure an appropriate damping characteristic for the shock absorber in the extension-phase hard damping characteristic region HS. The actual derivation of the target angular position of the pulse motor will be hereinbelow explained in detail in the second embodiment and a modification thereof.

Figure 14:
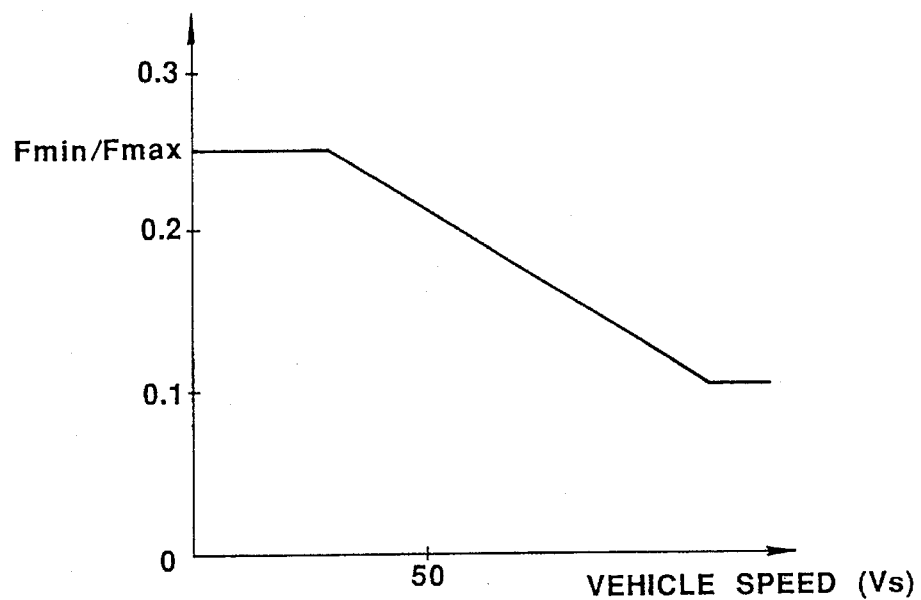
FIG. 14 is a graph illustrating a ratio of the minimum damping force characteristic to the maximum damping force characteristic versus a vehicle speed.

In step 210, the answer is affirmative, the procedure flows to step 211 in which a threshold value Ns for the current downward vertical velocity indicative signal value Vn is derived on the basis of the following equation.

$$Ns=(Fmin/Fmax)Vp2$$

where Fmin/Fmax represents a ratio of the damping force plotted on the minimum damping force characteristic curve Fmin for the compression phase to the damping force plotted on the maximum damping force characteristic curve Fmax for the compression phase at a predetermined piston speed of the shock absorber SA, and Vp2 represents a lower threshold value preselected at the maximum damping position which corresponds to the third angular position of the valve element 40 at which the damper exhibits the maximum damping force versus piston speed characteristic Fmax for the compression phase. Note that the lower threshold value Vp2 is not equivalent to the threshold value Ns set as a lower limit of the dead band, but corresponds to the preselected lower threshold value for the downward vertical velocity in relation to the maximum damping force characteristic for the compression phase. Thus, the shock absorber SA exhibits the compression-phase maximum damping characteristic in a velocity range above the preselected lower threshold value Vp2. It is preferable that the above-noted ratio Fmin/Fmax is variable depending on the vehicle speed Vs, so as to provide an optimal threshold value Ns for the dead band. The relationship of the ratio Fmin/Fmax to the vehicle speed Vs is stored in the control unit 4 as a data map shown in FIG. 14. As seen in FIG. 14, the ratio tends to be reduced in accordance with an increase in the vehicle speed.

Returning to step 210, if the answer is negative, the flow jumps from step 210 to step 212. In step 212, a test is made to determine whether the absolute value V n of the vertical velocity indicative signal value Vn exceeds the preselected lower threshold value Vp2. If the answer to step 212 is affirmative, the flow proceeds to step 213 in which the preselected lower threshold value Vp2 is renewed and replaced with the absolute value Vn of the vertical velocity. The threshold value Ns is also renewed owing to the renewed lower threshold value Vp2 as appreciated from the equation Ns=(Fmin/Fmax) Vp2. The renewals of the threshold values Vp2 and Ns are both performed at the region f see FIG. 12) until the vertical velocity indicative signal value Vn reaches a peak value P2 (see FIGS. 12 and 13) from the time point at which the vertical velocity indicative signal value Vn exceeds the preselected lower threshold value Vp2. When the answer to step 212 is negative, the flow jumps to step 214 in which a test is made to determine whether the absolute value V n of the vertical velocity is equal to or less than the current threshold value Ns of the dead band. If the answer to step 214 is affirmative, the flow proceeds to step 215 in which the angular position of the valve element 40 is shifted towards the neutral position shown in FIGS. 8A, 8B, and 8C and set at the target step angle of 0. Alternatively, if the answer to step 214 is negative, the flow proceeds to step 216 in which the target angular position of the pulse motor 3 or the target damping position of the shock absorber SA is derived on the basis of the magnitude of the current vertical velocity indicative signal value Vn so as to ensure an appropriate damping characteristic for the shock absorber in the compression-phase hard damping characteristic region SH.

In this manner, a one-cycle of the control procedure is terminated. The previously described routine is repeated and initiated immediately after elapse of one-cycle time.

The operation of the suspension system of the first embodiment will be hereinafter discussed in accordance with the time chart shown in FIG. 12.

Figure 12:
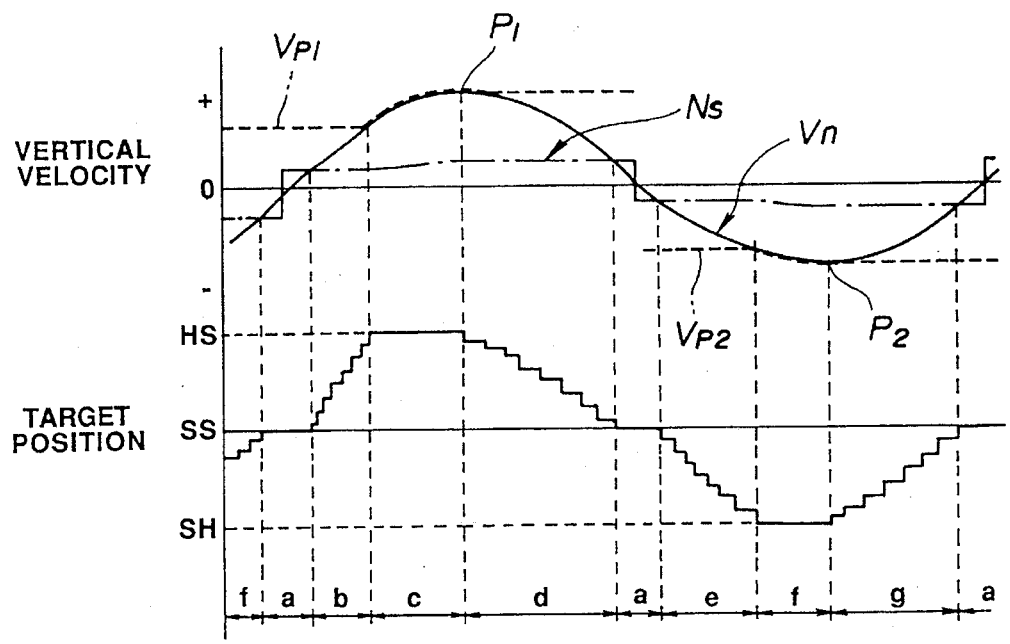
FIG. 12 is a time chart showing a relationship between an absolute vertical velocity indicative signal and a target position indicative signal.
Figure 13:
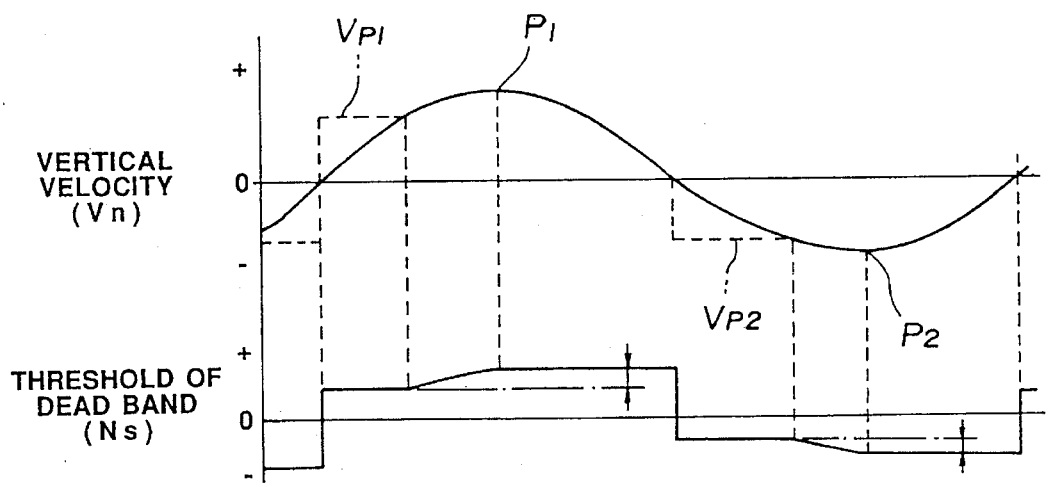
FIG. 13 is a time chart showing a relationship between the absolute vertical velocity indicative signal and a dead band indicative signal.

As seen in the regions a of FIG. 12, when the vertical velocity indicative signal value Vn is conditioned in a predetermined dead band defined by a pair of upper and lower threshold values Ns which have been derived on the basis of the previously noted equation Ns=(Fmin/Fmax) Vp1 and Ns=(Fmin/Fmax) Vp2, the shock absorber SA is adjusted into a soft damping characteristic region SS through rotation of the pulse motor 3. The provision of the dead band prevents undesirable power consumption, because the system is insusceptible to slight positive and negative fluctuations in the vertical velocity in the vicinity of the velocity of 0. The durability of the pulse motor may be enhanced.

As seen in the region b of FIG. 12, until the positive signal value Vn of the vertical velocity directed upward reaches the preselected upper (extension-phase) threshold value Vp1 after the positive signal value exceeds the upper threshold value Ns of the dead band, the shock absorber SA is adjusted within the extension-phase hard damping characteristic region HS, such that the damping characteristic for the compression phase is kept low (soft) and the damping characteristic for the extension phase is smoothly stepped up by shifting the target damping position of the shock absorber in proportion to the magnitude of the vertical velocity Vn of the sprung mass, i.e., by stepwise switching the angular position of the pulse motor 3 from the neutral position towards the leftmost angular position shown in FIG. 6 in the counterclockwise direction of its drive shaft.

As seen in the region e of FIG. 12, until the negative signal value Vn of the vertical velocity directed downward reaches the preselected lower (compression-phase) threshold value Vp2 after the absolute value of the negative signal value exceeds the lower threshold value Ns of the dead band, the shock absorber SA is adjusted within the compression-phase hard damping characteristic region SH, such that the damping characteristic for the extension phase is kept low (soft) and the damping characteristic for the compression phase is smoothly stepped up by shifting the target damping position of the shock absorber in proportion to the magnitude of the absolute value of the vertical velocity Vn of the sprung mass, i.e., by stepwise switching the angular position of the pulse motor 3 from the neutral position towards the rightmost angular position shown in FIG. 6 in the clockwise direction. In the regions b and e, the damping coefficient C for the extension-phase and for the compression phase can be controlled to be increased in proportion to the magnitude of the vertical velocity Vn in accordance with the equation C=k(Vn), where k is constant. During shifting from the region a to the region b or from the region a to the region e, since the starting point of the stepwise damping characteristic control is held in the soft damping characteristic region SS, the system can avoid a rapid change in damping characteristic of the shock absorber SA and additionally provide a wide variable range for the damping characteristic.

As seen in the region c of FIG. 12, until the upward (positive) vertical velocity indicative signal value Vn reaches the upper peak value P1 from the time point at which the vertical velocity indicative signal value Vn exceeds the preselected extension-phase threshold value Vp1, the preselected threshold value Vp1 is renewed by the current vertical velocity Vn and simultaneously the upper threshold value Ns of the dead band is renewed and increased in proportion to the increase between the initially preselected upper threshold value Vp1 and the renewed upper threshold value Vp1. Thereafter, until the direction of the vertical velocity is reversed after the vertical velocity Vn has descended from the peak value P1, the damping characteristic for the shock absorber SA is shifted from the extension-phase hard damping characteristic region HS to the soft damping characteristic region SS, stepwise (see the region d of FIG. 12). As seen in the region f of FIG. 12, until the downward (negative) vertical velocity indicative signal value Vn reaches the lower peak value P2 from the time point at which the absolute value Vn of the downward vertical velocity indicative signal value Vn exceeds the preselected compression-phase threshold value Vp2, the preselected threshold value Vp2 is renewed by the absolute value Vn of the current vertical velocity Vn and simultaneously the lower threshold value Ns of the dead band is renewed and increased in proportion to the difference between the initially preselected lower threshold value Vp2 and the renewed lower threshold value Vp2. Thereafter, until the direction of the vertical velocity is reversed after the vertical velocity Vn has passed through the peak value P2, the damping characteristic for the shock absorber SA is shifted from the compression-phase hard damping characteristic region SH to the soft damping characteristic region SS, stepwise (see the region g of FIG. 12).

As will be appreciated from the above, the upper threshold value of the dead band for the vertical velocity is not constant but shifted at a higher level (in the positive direction) than its initially set value as the upward vertical velocity Vn ascends to the peak value P1, while the lower threshold value of the dead band for the vertical velocity is not constant but shifted at a higher level (in the negative direction) than its initially set value as the downward vertical velocity Vn ascends to the peak value P2. As clearly seen in FIG. 13, the threshold value Ns of the dead band for the vertical velocity Vn is variably controlled, such that for the extension phase the threshold value Ns is maintained at a low threshold level corresponding to its initial set value represented by (Fmin/Fmax) Vp1 when the upward vertical velocity Vn is conditioned in a region defined by 0<Vn<Vp1 during ascending to the peak value P1, and is increased in proportion to an increase in the vertical velocity Vn when the upward vertical velocity Vn is conditioned in a region defined by Vp1<Vn<P1 during ascending to the peak value P1, and is maintained at a high threshold level represented by (Fmin/Fmax) P1 when the upward vertical velocity Vn is conditioned in a region defined by 0<Vn<P1 during descending from the peak value P1, and such that for the compression phase the threshold value Ns is maintained at a low threshold level corresponding to its initial set value represented by (Fmin/Fmax) Vp2 when the downward vertical velocity Vn is conditioned in a region defined by 0<Vn<Vp2 during ascending to the peak value P2, and is increased in proportion to an increase in the vertical velocity Vn when the downward vertical velocity Vn is conditioned in a region defined by Vp2<Vn<P2 during ascending to the peak value P2, and is maintained at a higher threshold level represented by (Fmin/Fmax) P2 when the downward vertical velocity Vn is conditioned in a region defined by 0<Vn<P2 during descending from the peak value P2. As set forth above, at the beginning of descending of the vertical velocity Vn from the peak values P1 and P2, the respective threshold values Vp1 or Vp2 are renewed and thus the absolute value of the current vertical velocity Vn is less than the renewed threshold value Vp1 or Vp2 and in addition the current vertical velocity Vn is necessarily greater than the threshold value Ns of the dead band, with the result that in FIG. 11 the control procedure jumps from step 205 to step 207 or from step 212 to 214 and thereafter advances quickly to step 209 or step 216 in order to assure a quick and smooth stepwise modification to a softer damping characteristic. Furthermore, since the threshold value Ns of the dead band is shifted to a higher level than its initially set threshold value within the velocity region descending from the peak values, at the end of descending of the vertical velocity Vn from the peaks, the control mode of the system is quickly shifted from the damping characteristic controlling mode to the dead band mode wherein the system unperforms the damping characteristic control and the damping characteristic of the shock absorber is held soft. Therefore, the system of the first embodiment can enhance a response of appropriate modification control of damping characteristics with respect to changes in the vertical velocity of the sprung mass.

Referring now to FIGS. 15 through 19, there are shown the second and third embodiments of the vehicular suspension system employing a variable semiactive damper. The basic construction of the system of the second and third embodiments are similar to that of the first embodiment. Therefore, the same reference numerals used in the first embodiment of FIGS. 1 through 14 will be applied to the corresponding elements used in the second and third embodiments, for the purpose of comparison between the first, second and third embodiments.

Second embodiment

Figure 15:
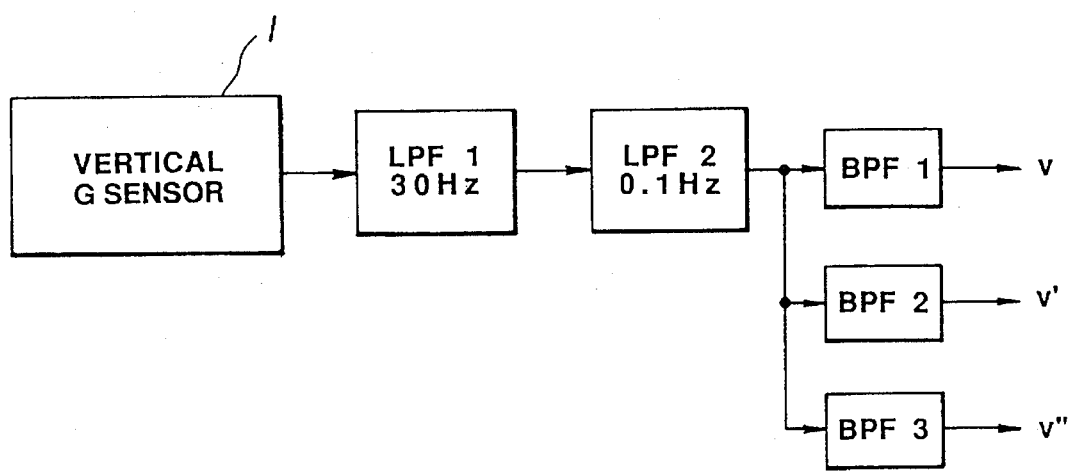
FIG. 15 is a schematic block diagram illustrating a control unit of the second embodiment.

The second embodiment shown in FIG. 15 is different from the first embodiment in that a control signal value V is derived on the basis of the absolute vertical velocity Vn of the sprung mass, although in the first embodiment the vertical velocity Vn directly functions as a control signal. In order to assure a more precise vehicle attitude change suppressing control, the system of the second embodiment has four set of filter circuits each of which is provided in the interface circuit 4a of the control unit 4 and connected to either one of the G sensor 1. As shown in FIG. 15, each of the filter circuits consists of a first low-pass filter LPF1 connected directly to the G sensor 1 and arranged for filtering out noise at a high-frequency range such as 30 Hz or more, a second low-pass filter LPF2 connected to the first low-pass filter for receiving the filtered-out vertical acceleration indicative signal from the filter LPF1 and for deriving an absolute vertical velocity indicative signal Vn through integration process, a first band-pass filter BPF1 connected to the second low-pass filter LPF2 for generating a bouncing motion component v by passing the received vertical velocity indicative signal Vn through a particular frequency band including a bouncing resonance frequency of the sprung mass, and a second band-pass filter BPF2 connected to the filter LPF2 for generating a pitching motion component v' by passing the received vertical velocity indicative signal Vn through a particular frequency band including a pitching resonance frequency of the sprung mass, and a third band-pass filter BPF3 connected to the filter LPF2 for generating a rolling motion component v" by passing the received vertical velocity indicative signal Vn through a particular frequency band including a rolling resonance frequency of the sprung mass. As per a group of control signal values $V_1$, $V_2$, $V_3$, $V_4$, a group of bouncing motion components $v_1$, $v_2$, $v_3$, $v_4$, a group of pitching motion components $v_1'$, $v_2'$, $v_3'$, $v_4'$, and a group of rolling motion components $v_1''$, $v_2''$, $v_3''$, $v_4''$, the suffixed numbers $_1$, $_2$, $_3$, and $_4$ are associated with the shock absorbers SA1, SA2, SA3, and SA4, respectively. In the second embodiment, the control signal values V ($V_1$, $V_2$, $V_3$, $V_4$) based on the vertical velocity indicative signals Vn1, Vn2, Vn3, and Vn4 which are related to front-right, front-left, rear-right and rear-left road wheels respectively, are derived by the following formulae. The damping coefficient C is adjusted in accordance with the calculated value derived by the equation C=kV.

$$V_1 = (v_1+v_2+v_3+v_4)\alpha_f/4 + \beta_f(v_1'-v_3') + \gamma_f(v_1''-v_2'')$$

$$V_2 = (v_1+v_2+v_3+v_4)\alpha_f/4 + \beta_f(v_2'-v_4') + \gamma_f(v_2''-v_1'')$$

$$V_3 = (v_1+v_2+v_3+v_4)\alpha_r/4 + \beta_r(v_3'-v_1') + \gamma_r(v_3''-v_4'')$$

$$V_4 = (v_1+v_2+v_3+v_4)\alpha_r/4 + \beta_r(v_4'-v_2') + \gamma_r(v_4''-v_3'')$$

where $\alpha_f$, $\beta_f$, $\gamma_f$, $\alpha_r$, $\beta_r$, and $\gamma_r$ are constant. At the right side of the above formulae, the respective first term including symbols $\alpha f$ or $\alpha r$ represents a bouncing rate substantially corresponding to a bouncing-motion damping coefficient, the respective second term including symbols $\beta f$ or $\beta r$ represents a pitching rate substantially corresponding to a pitching-motion damping coefficient, and the respective third term including symbols $\gamma_f$ or $\gamma_r$ represents a rolling rate substantially corresponding to a rolling-motion damping coefficient. The constant values $\alpha f$ and $\alpha r$ are determined depending on a front-wheel side spring constant and a rear-wheel side spring constant, respectively. The constant values $\beta f$ and $\beta r$ are determined depending on a front-wheel side pitching rigidity and a rear-wheel side pitching rigidity, respectively. Likewise, the constant values $\gamma_f$ and $\gamma_r$ are determined depending on a front-wheel side rolling rigidity and a rear-wheel side rolling rigidity, respectively.

As appreciated from the above, since the pitching rate and the rolling rate as well as the bouncing rate are reflected in the control signal value V, the system of the second embodiment can assure a superior riding comfort and driving stability by providing an appropriate damping characteristic suitable for suppressing all of bouncing, pitching, and rolling motions. In the embodiment, since the G sensors 1 are only installed on the vehicle body as a sensing device for a control parameter, the total manufacturing cost of the system is lowered at a minimum, as compared with the conventional system requiring plural sensors, such as a height sensor which detects a relative replacement between the sprung mass and the unsprung mass, a vertical acceleration sensor, and the like. Furthermore, three different proportional constants $\alpha$, $\beta$, and $\gamma$ insure more precise calculations of bouncing, pitching, and rolling rates, even though the bouncing resonance frequency, the pitching resonance frequency and the rolling resonance frequency are different from each other.

The previously noted arithmetic circuit of the second embodiment may be replaced with another arithmetic circuit executing calculation according to the following formulae.

$$V_1 = \alpha_f v_1 + \beta_f(v_1' - v_3') + \gamma_f(v_1'' - v_2'')$$

$$V_2 = \alpha_f v_2 + \beta_f(v_2' - v_4') + \gamma_f(v_2'' - v_1'')$$

$$V_3 = \alpha_r v_3 + \beta_r(v_3' - v_1') + \gamma_r(v_3'' - v_4'')$$

$$V_4 = \alpha r\, v_4 + \beta r(v_4' - v_2') + \gamma r(v_4'' - v_3'')$$

The above modification of the second embodiment is superior to the second embodiment in that four bouncing rates v are derived independently of each other on the basis of the respective vertical velocities monitored at four points of the vehicle body, respectively located adjacent to the four shock absorbers SA1, SA2, SA3, and SA4 in this modification, although four bouncing rates are derived on the basis of only one mean value of four vertical velocities in the second embodiment. In other words, the modification can provide a damping characteristic control suitable for bouncing motion rather than pitching and rolling motions.

Third embodiment

Figure 16:
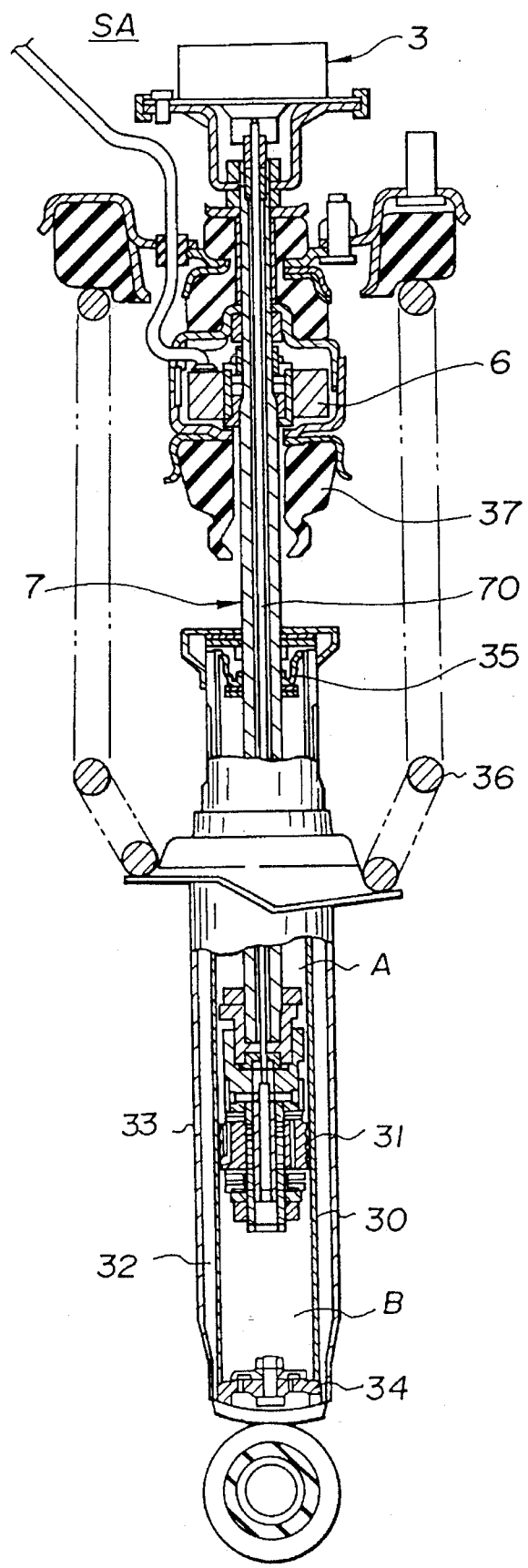
FIG. 16 is an illustration of a variable damping force shock absorber utilized for a third embodiment of the suspension system of the invention.
Figure 17:
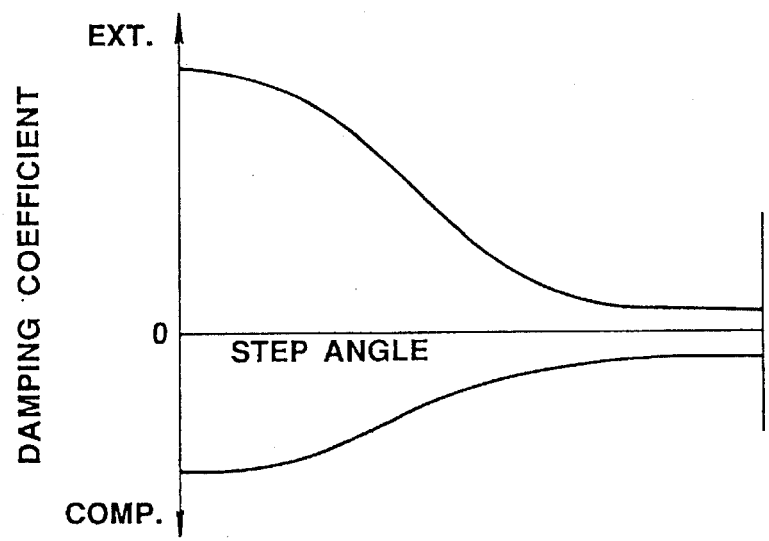
FIG. 17 is a graph illustrating damping coefficient versus step angle characteristics for the shock absorber employed in the third embodiment.
Figure 19:
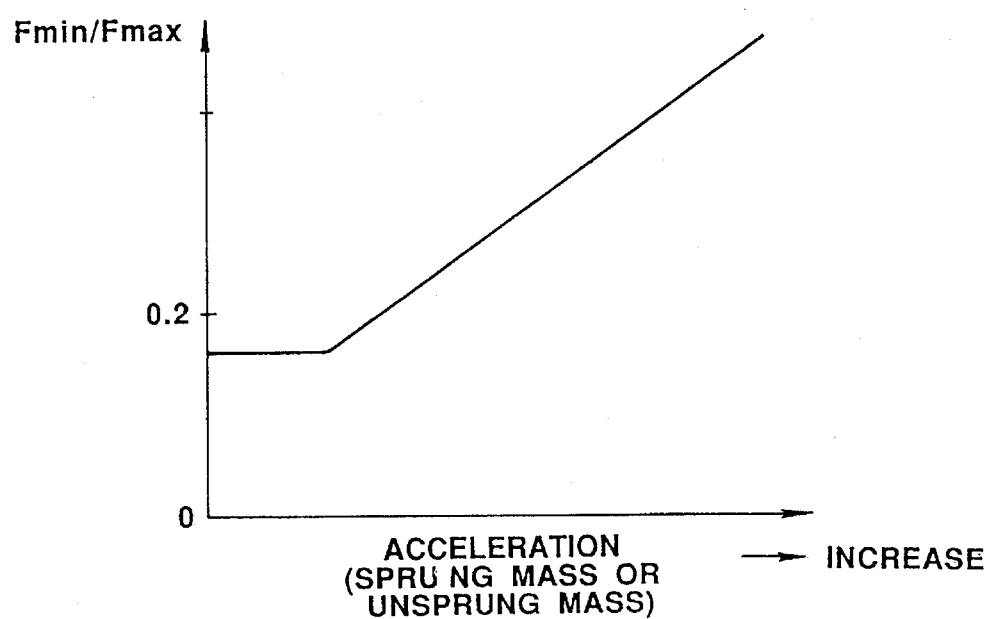
FIG. 19 is a graph illustrating a relationship between a ratio of the minimum damping force characteristic to the maximum damping force characteristic and a vertical acceleration exerted on the sprung mass or the unsprung mass.
Figure 18:
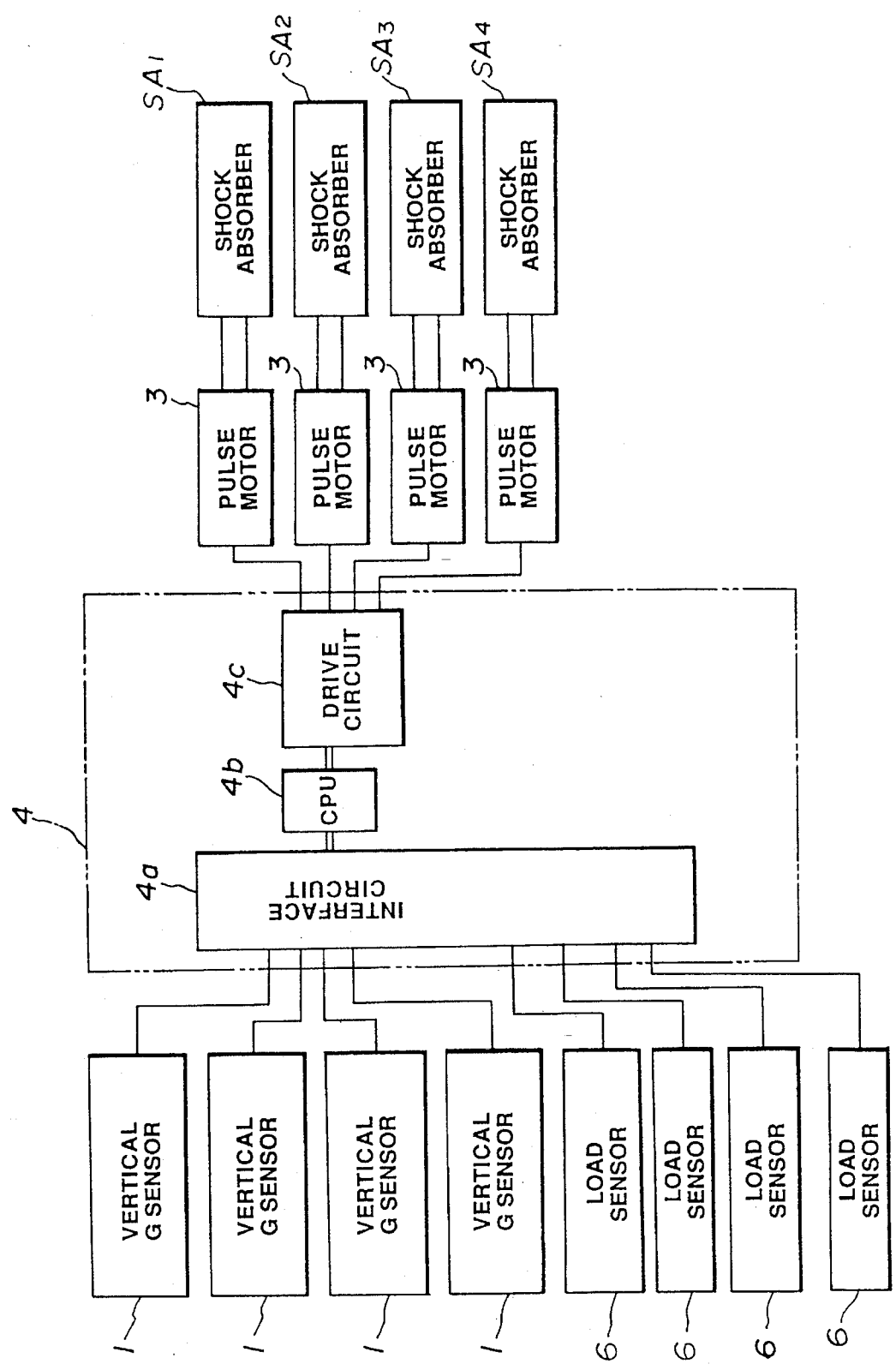
FIG. 18 is a block diagram illustrating the system of the third embodiment.

Referring now to FIGS. 16 through 19, there is shown the third embodiment of the vehicular suspension system employing a conventional variable damping force shock absorber having a damping characteristic shown in FIG. 17 in which a damping coefficient characteristic for the extension phase and a damping coefficient characteristic for the compression phase are both varied in accordance with change in a step angle of the pulse motor in a substantially same manner that damping characteristics for the extension phase and the compression phase are both kept hard at a relatively small step angle, while the two damping characteristics are kept soft at a relatively large step angle. Such a prior art shock absorber has been disclosed in Japanese Utility Model Provisional Publication No. 63-112914, whose disclosure is incorporated herein by reference. As seen in FIG. 18, the system of the third embodiment includes four load sensors 6 in addition to the circuits of the first embodiment illustrated in FIG. 2. As shown in FIG. 16, the respective load sensor 6 is provided in either one of the shock absorbers, for generating a signal representative of a relative velocity between the vehicle body and the suspension member, by detecting a damping force F of the shock absorber. The load sensor 6 is mounted on the piston rod 7 at a position slightly apart from the junction between the upper end of the shock absorber and the vehicle body.

In the system of the third embodiment, the control unit 4 determines whether the sign of the product of the derived control signal value V times the damping force F of the individual shock absorbers monitored by the load sensors 6 is positive or negative. When the sign of the product is positive, that is, the sign of the damping force F is equal to the sign of the control signal value V, the control unit 4 controls the damping force of the shock absorber SA in accordance with the control procedure illustrated in the flowchart of the first embodiment shown in FIG. 11. When the sign of the product is negative, i.e., the sign of the damping force F is different from that of the control signal value V, the respective damping characteristics for the extension phase and for the compression phase are adjusted to the softest damping force characteristics. In the case that the system of the third embodiment utilizes the control flow shown in FIG. 11 of the first embodiment, the vertical velocity indicative signal value Vn serving as a control parameter must be replaced with the control signal value V as derived in accordance with the formulae discussed in the second embodiment. As appreciated from the above, the suspension system of the third embodiment may provide the same effect as the first and second embodiments.

Although in the second embodiment four vertical velocities at four portions of the vehicle body close to the individual road wheels are used so that the pitching motion component v' is derived on the basis of the difference between the front-wheel side vertical velocity and the rear-wheel side vertical velocity and the rolling motion component v'' is derived on the basis of the difference between the right-wheel side vertical velocity and the left-wheel side vertical velocity, a change in a pitching angle and a change in a rolling angle produced by a gyro sensor mounted on the vehicle body may be used for derivation of the pitching motion and rolling motion components.

As previously discussed in the first embodiment, although the ratio Fmin/Fmax of the minimum damping force characteristic to the maximum damping force characteristic is changeable depending on the magnitude of the vehicle speed Vs, the ratio Fmin/Fmax may be changed depending on the vertical acceleration exerted on the sprung mass or the unsprung mass, or the relative velocity between the sprung mass and the unsprung mass.

Moreover, an initial dead-band threshold value for the extension phase and an initial dead-band threshold value for the compression phase may be set to different values. Alternatively, an initial dead-band threshold value for the front-wheel side and an initial dead-band threshold value for the rear-wheel side may be set to different values, so as to assure a more precise dead band control of the system.

In the embodiments set forth above, although the pulse motor is utilized for stepwise switching the damping characteristics of the hydraulic damper, an electronically operated proportional solenoid may be utilized for continuously switching the damping characteristics of the damper through a duty-cycle control according to which the solenoid is activated in response to a duty ratio essentially proportional to the magnitude of the control signal value treated by the control unit.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A vehicular suspension system comprising:

a variable damping force shock absorber disposed between a vehicle body and at least one of a plurality of road wheels and including a variable semi-active hydraulic damper which is operable between a plurality of different damping characteristics;

a sensor for detecting an absolute vertical velocity (Vn) of a sprung mass of the vehicle to generate an absolute vertical velocity indicative signal; and a control unit responsive to said vertical velocity, for generating a control signal (V) based on said vertical velocity (Vn) to adjust the damping characteristic of said damper;

wherein said control unit includes a dead-band controlling means for adjusting the damping characteristic to a minimum damping characteristic only when the control signal value is maintained within a controlled dead-band threshold value (Ns);

wherein said dead-band controlling means initially sets the dead-band threshold value (Ns) by multiplying a ratio of a damping force generated at a minimum damping characteristic to a damping force generated at a maximum damping characteristic at a predetermined piston speed of said damper with an initially-set maximum damping characteristic threshold (Vp1, Vp2) above which the damping characteristic of said damper is adjusted to said maximum damping characteristic, and wherein said dead-band controlling means renews said initially-set maximum damping characteristic threshold (Vp1, Vp2) with a current value of said control signal and varies said initially set dead-band threshold value (Ns) in proportion to changes in said renewed maximum damping characteristic threshold (Vp1, Vp2), until the control signal value (V) reaches a peak value (P1, P2), at which peak value a rate of change in said detected vertical velocity (Vn) is equal to zero, from the time when the control signal value (V) exceeds the initially set maximum damping characteristic threshold (Vp1, Vp2).

2. The vehicular suspension system as set forth in claim 1, wherein the threshold value of the dead band is maintained at said initially set dead-band threshold value when the absolute value of the control signal value is greater than 0 and less than said initially-set maximum damping characteristic threshold during ascending to the peak value, and is increased in proportion to an increase in the control signal value when the absolute value of the control signal value is greater than said initially-set maximum damping characteristic threshold and less than the peak value during ascending to the peak value, and is maintained at a higher threshold level than said initially set dead-band threshold value during descending from the peak value to 0.

3. The vehicular suspension system as set forth in claim 1, wherein an initial threshold value of the dead band of said vertical velocity for the front-wheel side and an initial threshold value of the dead band of said vertical velocity for the rear-wheel side are set independently to different values.

4. The vehicular suspension system as set forth in claim 1, wherein said damper comprises a stepwise variable semi-active damper in which the damping characteristic thereof is switched stepwise by an electronically operated step motor.

5. The vehicular suspension system as set forth in claim 1, wherein said damper comprises a continuously variable semiactive damper in which the damping characteristic thereof is continuously switched by an electronically operated actuator.

6. The vehicular suspension system as set forth in claim 1, wherein the control signal is equivalent to said vertical velocity indicative signal generated from said sensor.

7. The vehicular suspension system as set forth in claim 6, wherein an initial threshold value of the dead band of said vertical velocity for the extension phase of said shock absorber and an initial threshold value of the dead band of said vertical velocity for the compression phase of said shock absorber, are set independently to different values.

8. The vehicular suspension system as set forth in claim 6, wherein an initial threshold value of the dead band of said vertical velocity for the front-wheel side and an initial threshold value of the dead band of said vertical velocity for the rear-wheel side are set independently to different values.

9. The vehicular suspension system as set forth in claim 1, wherein the control signal is dependent on the product between a bouncing rate, a pitching rate, and a rolling rate, all of which are derived from said vertical velocity indicative signal.

10. The vehicular suspension system as set forth in claim 9, wherein the bouncing rate is derived on the basis of a mean value of four vertical velocities detected at four points of the vehicle body respectively located adjacent to four road wheels.

11. The vehicular suspension system as set forth in claim 9, wherein four bouncing rates are derived independently of each other on the basis of the respective vertical velocities detected at four points of the vehicle body respectively located adjacent to four road wheels.

12. A vehicular suspension system comprising:

a variable damping force shock absorber disposed between a vehicle body and at least one of a plurality of road wheels and including a variable semi-active hydraulic damper which is operable between a plurality of different damping characteristics;

a sensor for detecting an absolute vertical velocity of a sprung mass of the vehicle to generate an absolute vertical velocity indicative signal; and a control unit responsive to said vertical velocity, for generating a control signal based on said vertical velocity to adjust the damping characteristic of said damper;

wherein said control unit includes a dead-band controlling means for adjusting the damping characteristic to a minimum damping characteristic only when the control signal value is maintained within a controlled dead-band threshold value;

wherein said dead-band controlling-means initially sets the dead-band threshold value by multiplying a ratio of a damping force generated at a minimum damping characteristic to a damping force generated at a maximum damping characteristic at a predetermined piston speed of said damper with an initially-set maximum characteristic threshold above which the damping characteristic of said damper is adjusted to said maximum damping characteristic;

wherein said dead-band controlling means renews said initially-set maximum damping characteristic threshold with a current value of said control signal and varies said initially set dead-band threshold value in proportion to changes in said renewed maximum damping characteristic threshold, until the control signal value reaches a peak value, at which peak value a rate of change in said detected vertical velocity is equal to zero, from the time when the control signal value exceeds the initially-set maximum damping characteristic threshold; and wherein said ratio of the damping force generated at the minimum damping characteristic to the damping force generated at the maximum damping characteristic is varied depending on a vehicle speed.

13. The vehicular suspension system as set forth in claim 12, wherein said ratio is reduced in accordance with an increase in the vehicle speed.

14. A vehicular suspension system comprising:

a variable damping force shock absorber disposed between a vehicle body and one of its road wheels and including a variable semi-active hydraulic damper which is operable between a plurality of different damping characteristics;

a sensor for detecting an absolute vertical velocity of a sprung mass of the vehicle to generate an absolute vertical velocity indicative signal; and a control unit responsive to said vertical velocity, for generating a control signal based on said vertical velocity to adjust the damping characteristic of said damper;

wherein said control unit includes a dead-band controlling means for adjusting the damping characteristic to a minimum damping characteristic only when the control signal value is maintained within a controlled dead-band threshold value, wherein said dead-band controlling-means initially sets the dead-band threshold value by multiplying a ratio of a damping force generated at a minimum damping characteristic to a damping force generated at a maximum damping characteristic at a predetermined piston speed of said damper with an initially-set maximum characteristic threshold above which the damping characteristic of said damper is adjusted to said maximum damping characteristic;

wherein said dead-band controlling means renews said initially-set maximum damping characteristic threshold with a current value of said control signal and varies said initially set dead-band threshold value in proportion to changes in said renewed maximum damping characteristic threshold, until the control signal value reaches a peak value, at which peak value a rate of change in said detected vertical velocity is equal to zero, from the time when the control signal value exceeds the initially-set maximum damping characteristic threshold; and wherein an initial threshold value of the dead band of said vertical velocity for the extension phase of said shock absorber and an initial threshold value of the dead band of said vertical velocity for the compression phase of said shock absorber are set independently to different values.

15. A vehicular suspension system comprising:

a variable damping force shock absorber disposed between a vehicle body and either one of road wheels and including a variable semi-active hydraulic damper which is operable between a plurality of different damping characteristics;

a sensor for detecting an absolute vertical velocity of a sprung mass of the vehicle to generate an absolute vertical velocity indicative signal; and a control unit responsive to said vertical velocity, for generating a control signal based on said vertical velocity to adjust the damping characteristic of said damper;

wherein said control unit includes a dead-band controlling means for adjusting the damping characteristic to a minimum damping characteristic only when the control signal value is maintained within a controlled dead-band threshold value;

wherein said dead-band controlling-means initially sets the dead-band threshold value by multiplying a ratio of a damping force generated at a minimum damping characteristic to a damping force generated at a maximum damping characteristic at a predetermined piston speed of said damper with an initially-set maximum characteristic threshold above which the damping characteristic of said damper is adjusted to said maximum damping characteristic;

wherein said dead-band controlling means renews said initially-set maximum damping characteristic threshold with a current value of said control signal and varies said initially set dead-band threshold value in proportion to changes in said renewed maximum damping characteristic threshold, until the control signal value reaches a peak value, at which peak value a rate of change in said detected vertical velocity is equal to zero, from the time when the control signal value exceeds the initially-set maximum damping characteristic threshold; and wherein said damper is operable between an extension-phase hard region in which the damping characteristic for the extension phase is variably adjusted and the damping characteristic for the compression phase is stationarily maintained at the lowest damping characteristic, a compression-phase hard region in which the damping characteristic for the compression-phase is variably adjusted and the damping characteristic for the extension phase is stationarily maintained at the lowest damping characteristic, and a soft region in which the damping characteristics for the extension phase and the compression phase are both maintained at the lowest damping characteristics, and said control unit adjusts the damping characteristic of said damper into said extension phase hard region when the direction of said vertical velocity is an upward direction and the control signal value exceeds an upper threshold value of the dead band, and into said compression-phase hard region when the direction of said vertical velocity is a downward direction and the control signal value exceeds a lower threshold value of the dead band, and into said soft region when said vertical velocity is within said dead band.

16. The vehicular suspension system as set forth in claim 15, which further comprises a load sensor arranged in said shock absorber for detecting a damping force of said shock absorber, and wherein said control unit performs a damping force control for said damper on the basis of a comparison between the current signal value of said detected vertical velocity and the threshold value of the dead band controlled by said dead-band controlling means when the product of the control signal value times the damping force detected by said load sensor is positive, and said control unit adjusts the damping characteristic of said damper into said soft region when the product is negative.

* * * * *